(12) United States Patent
Kadokawa et al.

(10) Patent No.: US 11,485,392 B2
(45) Date of Patent: Nov. 1, 2022

(54) EDDY-CURRENT RAIL BRAKE DEVICE (71) Applicant: NIPPON STEEL CORPORATION, Tokyo (JP)

(72) Inventors: Shotaro Kadokawa, Tokyo (JP); Kenji Imanishi, Tokyo (JP); Hiroshi Nogami, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 0 days.

(21) Appl. No.: 17/258,268

(22) PCT Filed: Jul. 24, 2019

(86) PCT No.: PCT/JP2019/029003
§ 371 (c)(1),
(2) Date: Jan. 6, 2021

(87) PCT Pub. No.: WO2020/026913
PCT Pub. Date: Feb. 6, 2020

(65) Prior Publication Data
US 2021/0269069 A1 Sep. 2, 2021

(30) Foreign Application Priority Data

Jul. 30, 2018 (JP) .............................. JP2018-142483

(51) Int. Cl.
*B61H 7/08* (2006.01)
(52) U.S. Cl.
CPC .............. *B61H 7/083* (2013.01); *B61H 7/086* (2013.01)
(58) Field of Classification Search
CPC ....... B61H 7/083; B61H 7/086; B60T 13/748; F16D 63/008; F16D 2121/20; H02K 49/04

(Continued)

(56) References Cited

U.S. PATENT DOCUMENTS 3,723,795 A * 3/1973 Baermann ............ H02K 49/046
188/41
4,484,666 A * 11/1984 Steinmetz ................ B61H 7/08
188/165

(Continued)

FOREIGN PATENT DOCUMENTS

DE 974848 C 5/1961
DE 2614298 A * 2/1977 ............. B61H 7/083

(Continued)

OTHER PUBLICATIONS

Englished machined translation of DE-2614298 A, Feb. 1977.*
English machined trnslation of WO 2018/074280 A1, Apr. 26, 2018.*

*Primary Examiner* — Bradley T King
*Assistant Examiner* — San M Aung
(74) *Attorney, Agent, or Firm* — Greer Burns & Crain Ltd.

(57) ABSTRACT

An eddy-current rail brake device includes a row of magnets, a supporting member, a case, and a lifting device. The row of magnets includes a plurality of permanent magnets that are arranged in a traveling direction of a railroad car. To the supporting member, the row of magnets is mounted. The supporting member has magnetism. The case houses the row of magnets and the supporting member and includes a bottom portion that faces the row of magnets and is non-magnetic. The lifting device raises and lowers the supporting member inside the case while the row of magnets is kept facing the bottom portion. The eddy-current rail brake device can prevent or reduce adhesion of a foreign object and can be reduced in size in a right-left direction.

8 Claims, 5 Drawing Sheets

(58) Field of Classification Search
USPC .......................................................... 188/165
See application file for complete search history.

(56) References Cited

U.S. PATENT DOCUMENTS

| | | | | |
|---|---|---|---|---|
| 2004/0079597 | A1* | 4/2004 | Schmied | ................ B61H 7/086 |
| | | | | 188/73.37 |
| 2019/0232983 | A1 | 8/2019 | Kadokawa et al. | |

FOREIGN PATENT DOCUMENTS

| | | | |
|---|---|---|---|
| JP | 60223463 | A | 11/1985 |
| JP | 5151882 | A | 12/2012 |
| WO | 2010038910 | A2 | 4/2010 |
| WO | 2018074280 | A1 | 4/2018 |

* cited by examiner

EDDY-CURRENT RAIL BRAKE DEVICE

This is a National Phase Application filed under 35 U.S.C. § 371, of International Application No. PCT/JP2019/029003, filed Jul. 24, 2019, the contents of which are incorporated by reference.

TECHNICAL FIELD

The present disclosure relates to an eddy-current rail brake device. The present disclosure relates more particularly to an eddy-current rail brake device for a railroad car that provides braking force by generating, with a permanent magnet, an eddy current in a railroad rail.

BACKGROUND ART

Brake devices for railroad cars are roughly categorized into adhesion brake devices and non-adhesion brake devices. An adhesion brake device applies braking force to a railroad wheel to produce frictional force between a railroad rail and the railroad wheel, decelerating or stopping a railroad car. Examples of the adhesion brake device include a disk brake device. In contrast, a non-adhesion brake device does not use frictional force between a railroad rail and a railroad wheel but applies braking force directly to a railroad car to decelerate or stop the railroad car. Examples of non-adhesion brake devices include an eddy-current rail brake device.

An eddy-current rail brake device is provided with magnets. By putting a railroad rail within magnetic fields from the magnets, an eddy current is generated in the railroad rail having conductivity, so that counterforce is obtained as braking force. Such an eddy-current rail brake device is used in combination with a service brake such as a disk brake device or used as an emergency brake. In addition, use of permanent magnets as the magnets of such an eddy-current rail brake device is known.

An eddy-current rail brake device including permanent magnets is disclosed in, for example, Japanese Patent No. 5151882 (Patent Literature 1).

An eddy-current rail brake device of Patent Literature 1 includes a plurality of permanent magnets that are arranged in a straight line. The plurality of permanent magnets are housed in a case. In the plurality of permanent magnets, disposition of magnetic poles alternates in a direction of the arrangement. In braking, the plurality of permanent magnets face a railroad rail, generating an eddy current in the railroad rail. In contrast, in non-braking, the plurality of permanent magnets are rotated about a traveling direction of a railroad car, being separated from the railroad rail. This stops the generation of the eddy current in the railroad rail. With this configuration, the eddy-current rail brake device of Patent Literature 1 switches between a braking state and a non-braking state.

CITATION LIST

Patent Literature

Patent Literature Japanese Patent No. 5151882

SUMMARY OF INVENTION

Technical Problem

The eddy-current rail brake device of Patent Literature 1 switches between the braking state and the non-braking state by rotating the plurality of permanent magnets. Therefore, the case needs spaces having some areas in a right-left direction of the railroad car. When the case has a long length in the right-left direction, its protruding areas from external shapes of wheels become large when viewed from the traveling direction of the railroad car, which increases a possibility of a flying object colliding with the case during traveling. For this reason, it is desirable to reduce a length of the case in the right-left direction.

In addition, methods for switching to a braking state or a non-braking state include a rotation system as described in Patent Literature 1, as well as a system in which a case housing permanent magnets is brought close to or separated from a railroad rail. In an eddy-current rail brake device of such a close-and-separation system, permanent magnets are fixed to a case at a position as close as possible to a bottom portion of the case that faces a railroad rail so as to obtain braking force.

In this case, however, the permanent magnets being close to the bottom portion of the case may cause a foreign object to adhere to the bottom portion of the case by magnetic force of the permanent magnets. Since a magnetic flux density through the bottom portion of the case does not change between the braking state and the non-braking state, the foreign object once adhering to the bottom portion of the case less likely to fall off from the bottom portion of the case. To exert braking force sufficiently, it is desirable that no foreign object adhere to the bottom portion of the case.

An objective of the present disclosure is to provide an eddy-current rail brake device that prevents or reduces adhesion of a foreign object and is reduced in size in a right-left direction.

Solution to Problem

An eddy-current rail brake device according to the present disclosure to be mounted to a railroad car includes a row of magnets, a supporting member, a case, and a lifting device. The row of magnets includes a plurality of permanent magnets that are arranged in a traveling direction of the railroad car. To the supporting member, the row of magnets is mounted. The supporting member has magnetism. The case houses the row of magnets and the supporting member. A bottom portion of the case that faces the row of magnets is non-magnetic. The lifting device raises and lowers the supporting member inside the case while the row of magnets is kept facing the bottom portion.

Advantageous Effect of Invention

The eddy-current rail brake device according to the present disclosure can prevent or reduce adhesion of a foreign object and can be reduced in size in a right-left direction.

DESCRIPTION OF EMBODIMENT (1) An eddy-current rail brake device according to the present embodiment to be mounted to a railroad car includes a row of magnets, a supporting member, a case, and a lifting device. The row of magnets includes a plurality of permanent magnets that are arranged in a traveling direction of the railroad car. To the supporting member, the row of magnets is mounted. The supporting member has magnetism. The case houses the row of magnets and the supporting member. A bottom portion of the case that faces the row of magnets is non-magnetic. The lifting device raises and lowers the supporting member inside the case while the row of magnets is kept facing the bottom portion.

The eddy current rail brake device having such a configuration can raise and lower the row of magnets inside the case by operation of the lifting device. When the eddy-current rail brake device is in a braking state, the row of magnets is brought closest to the bottom portion of the case to generate an eddy current in a railroad rail immediately below the bottom portion of the case. In this case, magnetic force of the plurality of permanent magnets can cause a foreign object to adhere to the bottom portion of the case. Hence, the eddy current rail brake device according to the present embodiment is configured to change a position of the row of magnets inside the case (move the position away from the bottom portion of the case), so as to remove a foreign object adhering to the bottom portion of the case and to prevent or reduce adhesion of another foreign object. In addition, the row of magnets is raised and lowered inside the case. Therefore, the eddy-current rail brake device can be reduced in size in a right-left direction.

(2) in the eddy-current rail brake device according to (1), the lifting device preferably raises and lowers the case.

With such a configuration, raising and lowering the row of magnets inside the case and raising and lowering the case itself can be both provided by a single lifting device. It is therefore not necessary to provide, in addition to a lifting device for raising and lowering the row of magnets inside the case, another lifting device for raising and lowering the case itself. The configuration of the eddy-current rail brake device therefore can be simplified, which enables weight reduction. In addition, the row of magnets can be separated more from the railroad rail by raising the case, which can secure a non-braking state more reliably.

(3) In the eddy-current rail brake device according to (2), the lifting device preferably includes an actuator, a support bar, and a first stopper. The actuator is disposed above the case. The support bar penetrates a ceiling portion of the case. One end of the support bar is fixed to the supporting member and the other end the support bar connected to the actuator. The first stopper is disposed between the ceiling portion of the case and the supporting member and fixed to the support bar.

With such a configuration, in raising the row of magnets inside the case (when the row of magnets is brought close to the ceiling portion of the case), the first stopper bumps the ceiling portion of the case, which can limit the raising of the row of magnets inside the case. This can limit the raising of the row of magnets inside the case by a mechanical scheme rather than a complicated scheme such as one by electronic control.

(4) In the eddy-current rail brake device according to (3), the lifting device preferably further includes a second stopper that is disposed between the ceiling portion of the case and the actuator and fixed to the support bar.

With such a configuration, in lowering the row of magnets inside the case (when the row of magnets is brought close to the bottom portion of the case), the second stopper bumps the ceiling portion of the case, which can limit the lowering of the row of magnets inside the case. This can limit the lowering of the row of magnets inside the case by a mechanical scheme.

(5) in the eddy-current rail brake device according to (3) or (4), the case preferably includes a guide shaft and a magnetic-pole block. The guide shaft extends between the ceiling portion and the bottom portion and penetrates the supporting member. The magnetic-pole block supports a lower end of the guide shaft, is disposed being adjacent to one end of the row of magnets, and has magnetism.

When a plurality of permanent magnets are arranged in line, a permanent magnet at an end in an arranging direction is adjacent to another permanent magnet only on one side in the arranging direction and adjacent to no other permanent magnet on the other side. When a magnetic-pole block, which is a magnetic substance, is provided on the side of the permanent magnet at the end in the arranging direction on which the permanent magnet is adjacent to no other permanent magnet, a magnetic flux from the permanent magnet at the end in the arranging direction passes through the magnetic-pole block. This causes the permanent magnet at the end in the arranging direction and the magnetic-pole block to form a magnetic circuit, which enables enhancement of braking force. In addition, the magnetic-pole block supporting the guide shaft dispenses with another member for supporting the guide shaft, which also enables reduction in length of the eddy-current rail brake device in a front-back direction.

An embodiment of the present disclosure will be described below in detail with reference to the accompanying drawings. The same or equivalent parts in the drawings will be denoted by the same reference numerals, and description of the parts will not be repeated.

First, directions used herein will be described. As used herein, the term "front and back" means front and back in a traveling direction of a railroad car. As used herein, the term "up and down" means up and down in a state where the railroad car is erect and stationary. As used herein, the term "right and left" means right and left in a state where the railroad car faces in the traveling direction. As used herein, the terms "front and back", "up and down", and "right and left" used for an eddy-current rail brake device mean front and back, up and down, and right and left in a state where the eddy-current rail brake device is mounted to the railroad car.

Figure 1:
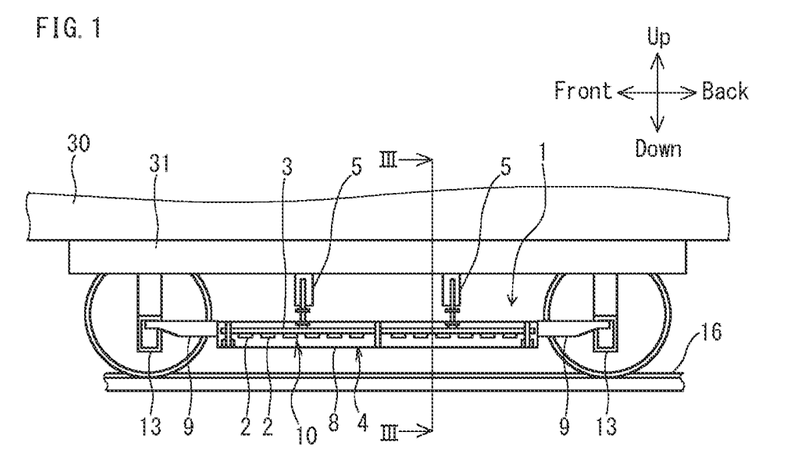
FIG. 1 is a side view illustrating an eddy-current rail brake device that is mounted to a railroad car.

FIG. 1 is a diagram illustrating an eddy-current rail brake device 1 that is mounted to a railroad car. FIG. 1 is a diagram of the eddy-current rail brake device 1 viewed from a lateral side of the railroad car, illustrating an internal structure of the eddy-current rail brake device 1 and illustrating a state where a row of magnets 10 is separated from a bottom portion 8 of a case 4. Referring to FIG. 1, the eddy-current rail brake device 1 is mounted to a bogie 31 of a railroad car 30. More specifically, a lifting device 5 of the eddy-current rail brake device 1 is mounted to the bogie 31. The lifting device 5 can bring the case 4 close to or separate the case 4 from a railroad rail 16 by moving the case 4 in an up-down direction. For example, when the eddy-current rail brake device 1 is not in use, the case 4 is separated from the railroad rail 16, and when the eddy-current rail brake device 1 is to be used, the case 4 is brought close to the railroad rail 16.

The eddy-current rail brake device 1 according to the present embodiment includes the row of magnets 10, a supporting member 3, the case 4, and the lifting device 5.

[Row of Magnets]

The row of magnets 10 includes a plurality of permanent magnets 2 that are arranged in a front-back direction. In the present specification, the plurality of permanent magnets 2 arranged in this manner will be referred to as a row of magnets as a whole. The phrase "being arranged in the front-back direction" means that the plurality of permanent magnets 2 are arranged in a straight line along the front-back direction as designed, and includes a case where the plurality of permanent magnets 2 are arranged strictly along the front-back direction, as well as a case where the plurality of permanent magnets 2 are arranged slightly deviating from a strictly straight line due to dimensional tolerance, mounting tolerance, or the like.

Figure 2:
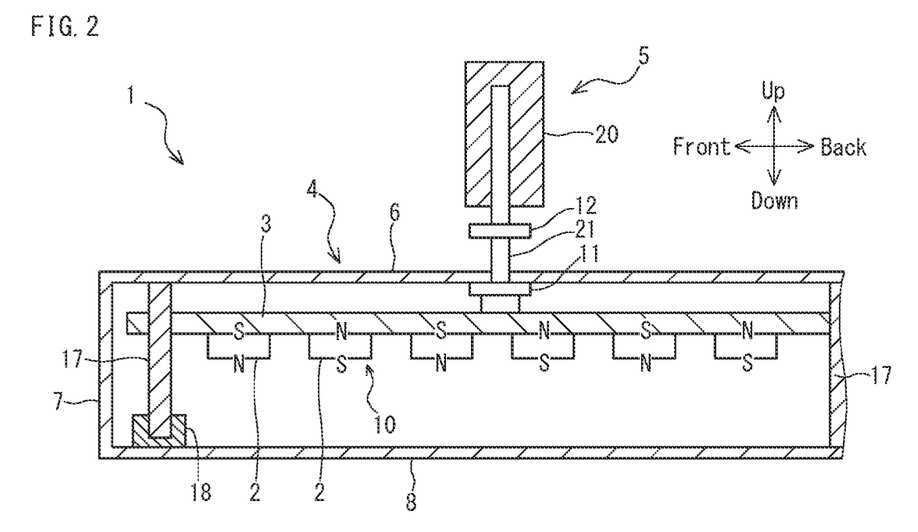
FIG. 2 is a half sectional view of an eddy-current rail brake device.

FIG. 2 is a half sectional view of the eddy-current rail brake device. Referring to FIG. 2, each of the permanent magnets 2 includes two magnetic poles (the N pole and the S pole). In each of the permanent magnets 2, orientation of the magnetic poles is in the up-down direction. In other words, one of the magnetic poles is disposed at a lower portion of each permanent magnet 2, and the other is disposed at an upper portion of the permanent magnet 2. The permanent magnets 2 alternate in the disposition of the magnetic poles in the direction of the arrangement. In other words, the orientation of the magnetic poles is reversed from each other between adjacent permanent magnets 2.

In the present embodiment, the plurality of permanent magnets 2 are spaced at regular intervals. However, the row of magnets 10 may include a portion where a space between adjacent permanent magnets 2 is different from a space between other adjacent permanent magnets 2. It is preferable that the plurality of permanent magnet 2 all have the same shape and be all made of the same material. The number of the permanent magnets 2 is not limited to a particular number and is to be set at an appropriate number based on a size and a required braking force of the eddy-current rail brake device.

[Supporting Member]

Figure 3:
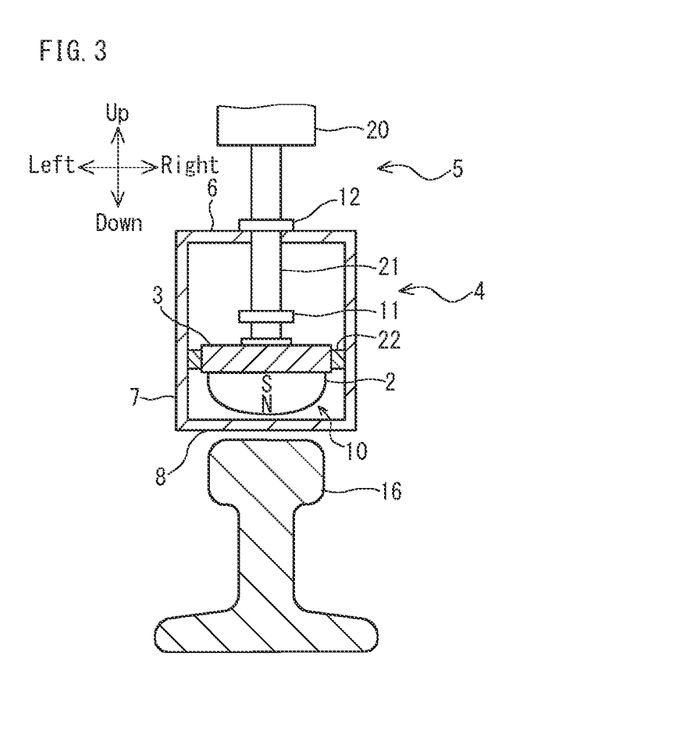
FIG. 3 is a cross sectional view taken along a line III-III in FIG. 1.

The supporting member 3 is an almost cuboid shape and extends in the front-back direction. The supporting member 3 is disposed above the row of magnets 10. To the supporting member 3, the row of magnets 10 is mounted. More specifically, the row of magnets 10 is fixed to a lower surface of the supporting member 3 by using adhesive, fastening bolts, or the like. The supporting member 3 has magnetism. This supporting member 3 can function as a yoke. There are no limitations on a size and a material of the supporting member 3 as long as its plate thickness and its width that allow formation of a magnetic circuit capable of exerting a predetermined braking force are kept. As the material of the supporting member 3, a known magnetic material (e.g., carbon steel, cast iron, etc.) may be used. This holds true for other magnetic materials to be described herein. The supporting member 3 is raised and lowered inside the case 4, which will be described below. Therefore, as illustrated in FIG. 3, dry bearings 22 are provided between the supporting member 3 and a side portion 7 of the case 4.

[Case]

The case 4 houses the row of magnets 10 and the supporting member 3. The case 4 has a box shape that extends in the front-back direction. As illustrated in FIG. 3, the case 4 is almost rectangular in sectional view perpendicular to the front-back direction. The case 4 includes a ceiling portion 6, the side portion 7, and the bottom portion 8.

The side portion 7 surrounds the plurality of permanent magnets 2 and the supporting member 3 on right, left, front, and back sides. The ceiling portion 6 is provided at an upper end of the side portion 7. The bottom portion 8 is provided at a lower end of the side portion 7. The ceiling portion 6 and the side portion 7 may be formed integrally. The bottom portion 8 and the side portion 7 may be formed integrally. The ceiling portion 6, the side portion 7, and the bottom portion 8 may be formed separately. The case 4 may or may not form an enclosed space. In other words, the case 4 may be partially provided with a hole or the like.

The bottom portion 8 faces the row of magnets 10. The bottom portion 8 faces the magnetic poles disposed at the lower portions of the permanent magnets 2. The bottom portion 8 is made of a non-magnetic material. In a case where the bottom portion 8 is non-magnetic, adhesion of a foreign object to the bottom portion 8 of the case 4 is prevented or reduced by separating the plurality of permanent magnets 2 from the bottom portion 8 as will be described below. Examples of the material of the bottom portion 8 include resin and non-magnetic metal (austenitic stainless steel, etc.). The ceiling portion 6 and the side portion 7 of the case 4 may also be non-magnetic.

Referring to FIG. 2, the case 4 may further include a guide shaft 17 and a magnetic-pole block 18. The guide shaft 17 extends between the ceiling portion 6 and the bottom portion 8 of the case 4. In other words, the guide shaft 17 extends in the up-down direction. The guide shaft 17 penetrates a hole provided in the supporting member 3. The guide shaft 17 guides the supporting member 3 so that the supporting member 3 can be raised and lowered stably in the up-down direction. In addition, the guide shaft 17 retains supporting member 3 so as to resist a counterforce that the supporting member 3 receives, in braking, from the railroad rail 16 in a direction opposite to the traveling direction of the railroad car, so that loads applied to an actuator 20 in the right-left direction and the front-back direction can be suppressed. An upper end of the guide shall 17 is fixed to the ceiling portion 6 of the case 4. The number of guide shafts 17 is not limited to a particular number, and an appropriate number of guide shafts 17 is provided.

The magnetic-pole block 18 is disposed being adjacent to at least one of ends of the row of magnets 10. The magnetic-pole block 18 is disposed side by side in the traveling direction with a permanent magnet 2 that is disposed at an end of the row of magnets 10. The magnetic-pole block 18 is disposed ahead of the row of magnets 10. In the present embodiment, another magnetic-pole block 18 can be disposed behind the row of magnets 10. The magnetic-pole block 18 may be disposed only either ahead of or behind the row of magnets 10.

In the present embodiment, a space between the magnetic-pole block 18 and the permanent magnet 2 disposed at the end of the row of magnets 10 is the same as the space between the plurality of permanent magnets 2. However, the space between the magnetic-pole block 18 and the permanent magnet 2 disposed at the end of the row of magnets 10 may be different from the space between the plurality of permanent magnets 2. The magnetic-pole block 18 is fixed to the bottom portion 8 of the case 4, supporting a lower end of the guide shaft 17. More specifically, the magnetic-pole block 18 is provided with a supporting hole. By inserting an end of the guide shall 17 closer to the bottom portion 8 into the supporting hole, the magnetic-pole block 18 supports the guide shaft 17. The magnetic-pole block 18 has magnetism. As a material of the magnetic-pole block 18, a known magnetic material (e.g., carbon steel, cast iron, etc.) may be used.

Referring to FIG. 1, the case 4 is supported by two arms 9 that are provided at both ends of the case 4 in the front-back direction. The two arms 9 are mounted to sliders 13 that are fixed to the bogie 31 of the railroad car 30 such that the arms 9 can be raised and lowered.

[Lifting Device]

Referring to FIG. 2, the lifting device 5 includes the actuator 20, a support bar 21, a first stopper 11, and a second stopper 12.

The actuator 20 is disposed above the case 4. The actuator 20 is fixed to the bogie 31 of the railroad car 30. There is no limitation on a driving system of the actuator 20 as long as the actuator 20 satisfies a predetermined advance/retract amount and a predetermined thrust, and a hydraulic actuator using water, oil, or the like, or an electromagnetically controlled actuator may be used. The support bar 21 extends in the up-down direction. The support bar 21 penetrates the ceiling portion 6 of the case 4. A lower end of the support bar 21 is fixed to the supporting member 3. An upper end of the support bar 21 is connected to the actuator 20. By operating the actuator 20, the support bar 21 advances from and retracts to the actuator 20 along the up-down direction. As will be described below, causing the support bar 21 to advance and retract makes it possible to raise and lower the case 4 itself and raise and lower the row of magnets 10 and the supporting member 3 inside the case 4.

The first stopper 11 is disposed between the ceiling portion 6 of the case 4 and the supporting member 3. The first stopper 11 has an almost disk shape. An inner circumferential edge of the first stopper 11 is fixed to the support bar 21. When viewed from above the eddy-current rail brake device 1, the first stopper 11 overlaps the ceiling portion 6 of the case 4. Therefore, when the row of magnets 10 and the supporting member 3 are raised to a certain position, the first stopper 11 bumps the ceiling portion 6 of the case 4. The raising of the row of magnets 10 and the supporting member 3 is thereby stopped. In addition, the first stopper 11 bears a weight of the case 4. In other words, the first stopper 11 plays roles of limiting the raising of the row of magnets 10 and the supporting member 3 and limiting the lowering of the case 4.

The second stopper 12 is disposed between the ceiling portion 6 of the case 4 and the actuator 20. The second stopper 12 has an almost disk shape. An inner circumferential edge of the second stopper 12 is fixed to the support bar 21. When viewed from above the eddy-current rail brake device 1, the second stopper 12 overlaps the ceiling portion 6 of the case 4. Therefore, when the row of magnets 10 and the supporting member 3 are lowered to a certain position, the second stopper 12 bumps the ceiling portion 6 of the case 4. The lowering of the row of magnets 10 and the supporting member 3 is thereby stopped. In other words, the second stopper 12 plays a role of limiting the lowering of the row of magnets 10 and the supporting member 3.

When viewed from above the eddy-current rail brake device 1, outer edge shapes of the first stopper 11 and the second stopper 12 are not limited to circular shapes. The outer edge shapes of the first stopper 11 and the second stopper 12 may be each an ellipse, a polygon, or the like. When viewed from above the eddy-current rail brake device 1, at least portions of the first stopper 11 and the second stopper 12 only have to overlap the ceiling portion 6 of the case 4.

With such a configuration, the lifting device 5 has both a function of raising and lowering the row of magnets 10 and a function of raising and lowering the case 4. The lifting device 5 raising and lowering the row of magnets 10 can prevent or reduce adhesion of a foreign object to the bottom portion 8 of the case 4, and the lifting device 5 raising and lowering the case 4 can switch to a non-braking state reliably. This regard will be described below with description of operation of the eddy-current rail brake device.

[Operation of Eddy-Current Rail Brake Device 1]

Figure 4:
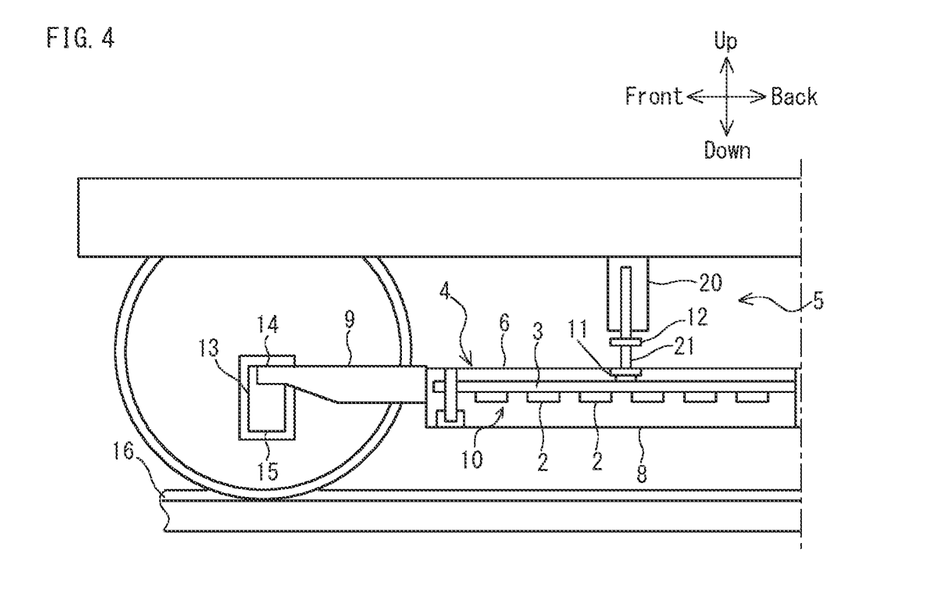
FIG. 4 is a diagram illustrating the eddy-current rail brake device in a state where a case and a row of magnets are most separated from a railroad rail.

FIG. 4 is a diagram illustrating the eddy-current rail brake device 1 in a state where the case 4 and the row of magnets 10 are most separated from the railroad rail 16. Referring to FIG. 4, in a case where the case 4 and the row of magnets 10 are both positioned uppermost (hereinafter, referred to be an "upper-position mode"), the arms 9 bump upper ends 14 of the sliders 13, and the first stopper 11 bumps a lower surface of the ceiling portion 6. In the upper-position mode, weights of the case 4, the row of magnets 10, and the supporting member 3 are borne by the first stopper 11.

Figure 5:
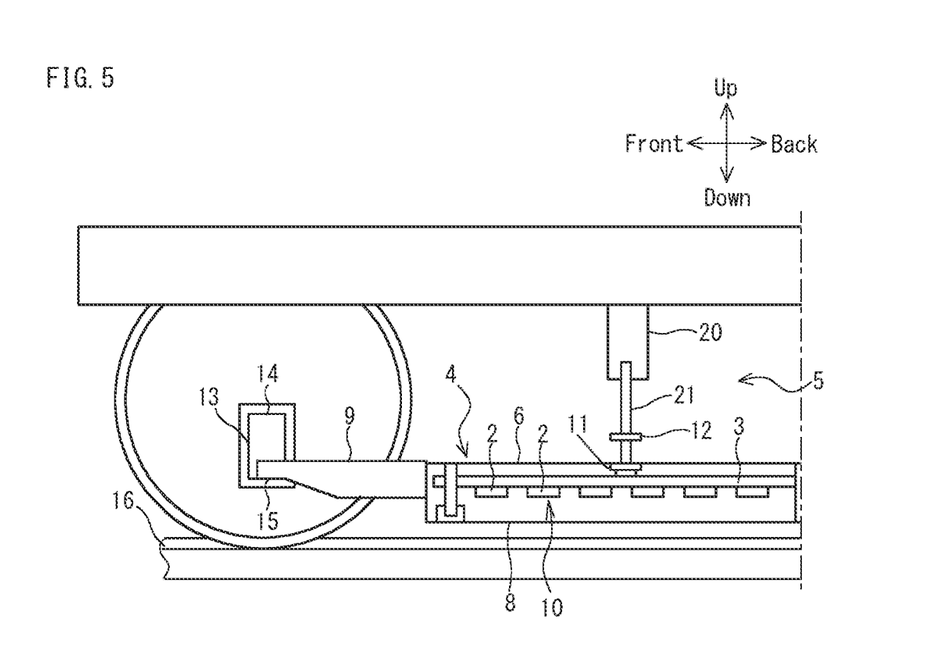
FIG. 5 is a diagram illustrating the eddy-current rail brake device in a state where the case is lowered from the state illustrated in FIG. 4.

FIG. 5 is a diagram illustrating the eddy-current rail brake device 1 in a state where the case 4 is lowered from the state illustrated in FIG. 4. Referring to FIG. 5, from the upper-position mode, when the actuator 20 is operated to lower the support bar 21, the case 4 and the arms 9 are lowered along the sliders 13 while the first stopper 11 bears the weight of the case 4. In other words, the case 4 and the arms 9 are lowered while being suspended. At this time, the row of magnets 10 is lowered while facing the bottom portion 8. In addition, the lower surface of the supporting member 3 is also lowered while facing the bottom portion 8.

When the arms 9 continue to be lowered, the arms 9 bump lower ends 15 of the sliders 13, which ends the lowering of the case 4 and the arms 9. Hereinafter, a state where the lowering of the case 4 is ended, and the row of magnets 10 is positioned uppermost inside the case 4 will be referred to as a "middle-position mode". In the middle-position mode, the row of magnets 10 is brought closer to the railroad rail 16 by a distance of the lowering of the case 4. However, positions of the row of magnets 10 and the supporting member 3 inside the case 4 are unchanged from the upper-position mode.

Figure 6:
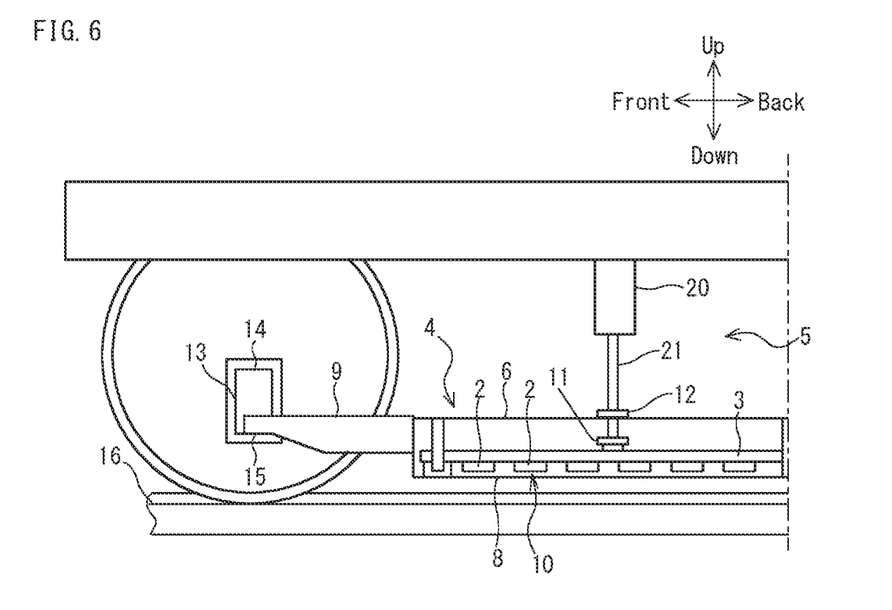
FIG. 6 is a diagram illustrating the eddy-current rail brake device in a state where the row of magnets is lowered inside the case from the state illustrated in FIG. 5.

FIG. 6 is a diagram illustrating the eddy-current rail brake device 1 in a state where the row of magnets 10 is lowered inside the case 4 from the state illustrated in FIG. 5. Referring to FIG. 6, when the support bar 21 is further lowered from the middle-position mode, the first stopper 11 is separated from the ceiling portion 6 of the case 4, and the row of magnets 10 is lowered inside the case 4. At this time, the row of magnets 10 is lowered while facing the bottom portion 8. In addition, the lower surface of the supporting member 3 is also lowered while facing the bottom portion 8. During the lowering, the case 4 and the arms 9 are supported by the lower ends 15 of the sliders 13.

When the row of magnets 10 continues to be lowered, the second stopper 12 bumps an upper surface of the ceiling portion 6 of the case 4, which ends the lowering of the row of magnets 10. Hereinafter, a state where the lowering of both the case 4 and the row of magnets 10 is ended will be referred to as a "lower-position mode".

In the lower-position mode, the row of magnets 10 is brought closest to the railroad rail 16. Therefore, in the lower-position mode, raising-lowering distances of the case 4 and the row of magnets 10 are adjusted such that the eddy-current rail brake device 1 is brought into the braking state. In contrast, in the upper-position mode, since the row of magnets 10 is most separated from the railroad rail 16, the raising-lowering distances of the case 4 and the row of magnets 10 are adjusted such that the eddy-current rail brake device 1 is brought into the non-braking state in the upper-position mode. Note that in a case where an raising-lowering distance of the row of magnets 10 inside the case 4 can be kept sufficiently, the eddy-current rail brake device 1 may be brought into the non-braking state in the middle-position mode (see FIG. 5).

To switch the eddy-current rail brake device 1 from the braking state to the non-braking state, the reciprocal of the above-described process is performed. Next, the braking state and the non-braking state will be described in detail.

[Magnetic Circuit in Braking State]

Figure 7:
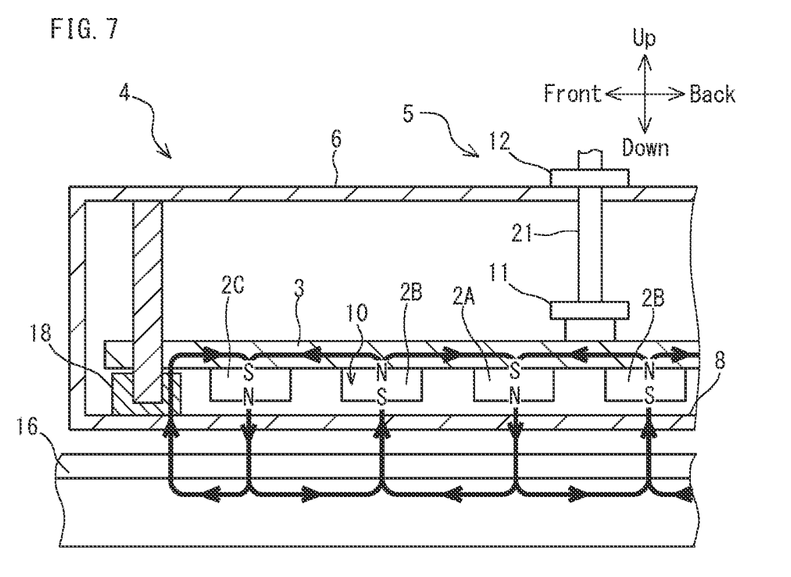
FIG. 7 is a diagram illustrating a magnetic circuit in a braking state.

FIG. 7 is a diagram illustrating a magnetic circuit in the braking state. Referring to FIG. 7, a permanent magnet 2A having ran N pole disposed at its lower portion will be described as an example. A magnetic flux coming out from the N pole of the permanent magnet 2A passes through the non-magnetic bottom portion 8 of the case 4 to reach the railroad rail 16. The magnetic flux reaching the railroad rail 16 reaches two permanent magnets 2B that are on both sides of the permanent magnet 2A having the N pole disposed at its lower portion and that have S poles disposed at their lower portions. Magnetic fluxes coming out from N poles disposed at upper portions of these permanent magnets 2B pass through the supporting member 3 having magnetism to reach an S pole of the adjacent permanent magnet 2A. In other words, a magnetic circuit is formed by two neighboring permanent magnets 2A and 2B, and the supporting member 3.

In the braking state (the lower-position mode), the railroad rail 16 is in a magnetic field formed by this magnetic circuit. While the railroad car is traveling, the railroad rail 16, which is an electric conductor, moves in this magnetic field. As a result, in the braking state, an eddy current is produced in the railroad rail 16, and the Lorentz force acts on the railroad rail 16. As a reaction of the Lorentz force, a counterforce (braking force) acts on the eddy-current rail brake device (i.e., the railroad car).

A magnetic circuit formed by a permanent magnet 2C that is disposed at one end of the row of magnets 10 and the magnetic-pole block 18 adjacent to the permanent magnet 2C is as follows. In a case where an N pole of the permanent magnet 2C is disposed at a lower portion of the permanent magnet 2C, a magnetic flux coming out from the N pole passes through the bottom portion 8 of the case 4 and the railroad rail 16 to reach the magnetic-pole block 18 having magnetism. The magnetic flux reaching the magnetic-pole block 18 passes through the supporting member 3 to reach an S pole of the permanent magnet 2C. In other words, the permanent magnet 2C, the magnetic-pole block 18, and the supporting member 3 form a magnetic circuit.

This allows a magnetic circuit to be formed at an end of the row of magnets 10, which enhances the braking force. In a case where the side portion 7 of the case 4 is formed of a magnetic material, the magnetic flux from the permanent magnet 2C disposed at the end of the row of magnets 10 can be led into the side portion 7 of the case 4 from the magnetic-pole block 18 in non-braking. As a result, magnetic leakage to the outside of the case 4 can be prevented or reduced.

[Magnetic Circuit in Non-Braking State]

Figure 8:
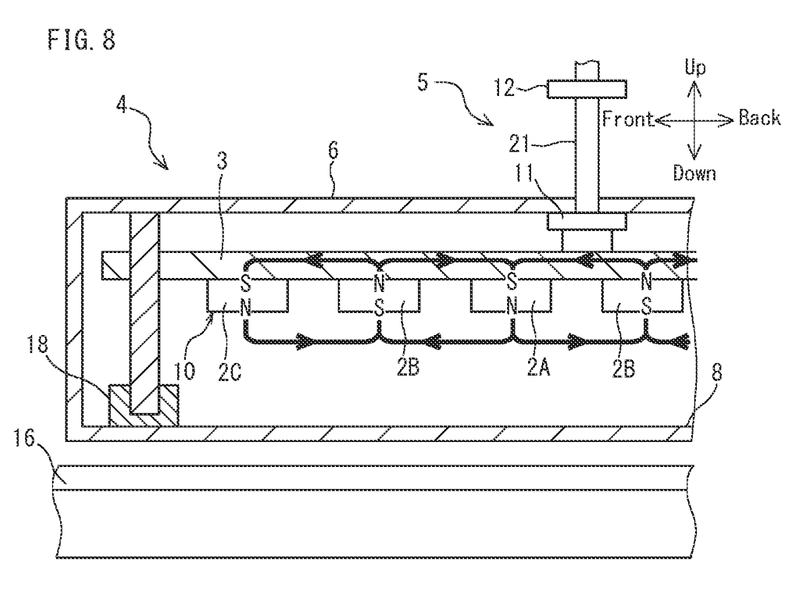
FIG. 8 is a diagram illustrating a magnetic circuit in a non-braking state.

FIG. 8 is a diagram illustrating a magnetic circuit in the non-braking state. Referring to FIG. 8, in the non-braking state (the upper-position mode), the row of magnets 10 is separated from the railroad rail 16 sufficiently. Therefore, the railroad rail 16 is little influenced by the magnetic fluxes from the plurality of permanent magnets 2, and little eddy current is produced in the railroad rail 16. In other words, little braking force acts on the railroad car.

As seen from the above, in the eddy-current rail brake device 1 according to the present embodiment, switching between the braking state and the non-braking state is performed by moving the row of magnets 10 in the up-down direction. In the eddy-current rail brake device 1 according to the present embodiment, rotation of the row of magnets 10 is not necessary to switch between the braking state and the non-braking state. Therefore, the eddy-current rail brake device 1 can be reduced in size in the right-left direction. In addition, since the row of magnets 10 can be raised and lowered inside the case 4, adhesion of a foreign object to the bottom portion 8 of the case 4 can be prevented or reduced. This regard will be described below.

Referring to FIG. 6, in the lower-position mode, the row of magnets 10 is closest to the bottom portion 8 of the case 4 to exert the braking force. Therefore, the magnetic force of the plurality of permanent magnets 2 tends to cause a foreign object from the outside to adhere to an outer surface of the bottom portion 8 of the case 4. If the case 4 is raised while the position of the row of magnets 10 inside the case 4 is kept (i.e., while the row of magnets 10 remains closest to the bottom portion 8 of the case 4), a magnetic flux density through the bottom portion 8 of the case 4 is unchanged from the lower-position mode. As a result, a foreign object adhering to the bottom portion 8 of the case 4 in the lower-position mode remains adhering to the bottom portion 8 of the case 4. Moreover, another foreign object tends to adhere to an outer surface of the bottom portion 8 of the case 4.

In this regard, in the eddy-current rail brake device 1 according to the present embodiment, the row of magnets 10 can be raised and lowered inside the case 4 (the middle-position mode). In other words, the row of magnets 10 can be brought close to and separated from the bottom portion 8 of the case 4 independently of the raising and lowering of the case 4. When the lower-position mode is shifted to the middle-position mode, the row of magnets 10 is separated from the bottom portion 8 of the case 4. As a result, the magnetic flux density through the bottom portion 8 of the case 4 decreases, which can drop the foreign object adhering to the bottom portion 8 of the case 4. Moreover, the adhesion of another foreign object to the outer surface of the bottom portion 8 of the case 4 can be prevented or reduced.

An embodiment according to the present disclosure has been described above. However, the embodiment described above is merely an example of practicing the present disclosure. The present disclosure is therefore not limited to the embodiment described above, and the embodiment described above can be modified and practiced as appropriate, as follows for example, without departing from the scope of the present disclosure.

The above description is made as to the case where the eddy-current rail brake device includes the two lifting devices. However, the number of the lifting devices may be one as long as the supporting member and the plurality of permanent magnets can be raised and lowered while being kept in balance.

The above description is made as to the case where each lifting device includes the actuator, the support bar, the first stopper, and the second stopper. However, each lifting device is not limited to this and may raise and lower the plurality of permanent magnets by electronic control.

The above description is made as to the case where each lifting device has both the function of raising and lowering the case and the function of raising and lowering the plurality of permanent magnets. However, the eddy current rail brake device according to the present embodiment does not preclude the inclusion of a lifting device for raising and lowering the case and a separate lifting device for raising and lowering the supporting member and the plurality of permanent magnets.

INDUSTRIAL APPLICABILITY

The eddy-current rail brake device according to the present disclosure is applicable to braking of a railroad car.

REFERENCE SIGNS LIST

1: eddy-current rail brake device
2: permanent magnet
3: supporting member
4: case
5: lifting device
6: ceiling portion
8: bottom portion
10: row of magnets
11: first stopper
12: second stopper
13: slider
16: railroad rail
17: guide shaft
18: magnetic-pole block
20: actuator
21: support bar
30: railroad car
31: bogie

The invention claimed is:

1. An eddy-current rail brake device to be mounted to a railroad car, the eddy-current rail brake device comprising:
a row of magnets that includes a plurality of permanent magnets that are arranged in a traveling direction of the railroad car;
a supporting member to which the row of magnets is mounted, the supporting member having magnetism;
a case that houses the row of magnets and the supporting member, the case including a bottom portion that faces the row of magnets and is non-magnetic; and
a lifting device that raises and lowers the supporting member inside the case while the row of magnets is kept facing the bottom portion, wherein
the lifting device raises and lowers the case.

2. The eddy-current rail brake device according to claim 1, wherein
the lifting device includes:
an actuator that is disposed above the case;
a support bar that penetrates a ceiling portion of the case, one end of the support bar being fixed to the supporting member and another end of the support bar being connected to the actuator; and
a first stopper that is disposed between the ceiling portion and the supporting member and fixed to the support bar.

3. The eddy-current rail brake device according to claim 2, wherein
the lifting device further includes
a second stopper that is disposed between the ceiling portion and the actuator and fixed to the support bar.

4. The eddy-current rail brake device according to claim 2, wherein
the case includes:
a guide shaft that extends between the ceiling portion and the bottom portion and penetrates the supporting member; and
a magnetic-pole block that supports a lower end of the guide shaft, is disposed being adjacent to one end of the row of magnets, and has magnetism.

5. The eddy-current rail brake device according to claim 3, wherein
the case includes:
a guide shaft that extends between the ceiling portion and the bottom portion and penetrates the supporting member; and
a magnetic-pole block that supports a lower end of the guide shaft, is disposed being adjacent to one end of the row of magnets, and has magnetism.

6. An eddy-current rail brake device to be mounted to a railroad car, the eddy-current rail brake device comprising:
a row of magnets that includes a plurality of permanent magnets that are arranged in a traveling direction of the railroad car;
a supporting member to which the row of magnets is mounted, the supporting member having magnetism;
a case that houses the row of magnets and the supporting member, the case including a bottom portion that faces the row of magnets and is non-magnetic;
a first lifting device that raises and lowers the supporting member inside the case while the row of magnets is kept facing the bottom portion; and
a second lifting device that raises and lowers the case.

7. The eddy-current rail brake device according to claim 1,
wherein
the case includes:
a guide shaft that extends between a ceiling portion of the case and the bottom portion and penetrates the supporting member; and
a magnetic-pole block that supports a lower end of the guide shaft, is disposed being adjacent to one end of the row of magnets, and has magnetism.

8. The eddy-current rail brake device according to claim 6, wherein
the case includes:
a guide shaft that extends between a ceiling portion of the case and the bottom portion and penetrates the supporting member; and
a magnetic-pole block that supports a lower end of the guide shaft, is disposed being adjacent to one end of the row of magnets, and has magnetism.

* * * * *